US006927756B1

(12) United States Patent
Hauck

(10) Patent No.: US 6,927,756 B1
(45) Date of Patent: Aug. 9, 2005

(54) APPARATUS AND METHOD FOR CONTROLLING AN ELECTRONIC PRESENTATION

(75) Inventor: Lane T. Hauck, San Diego, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/434,908

(22) Filed: Nov. 5, 1999

(51) Int. Cl.[7] .............................................. G09G 5/08
(52) U.S. Cl. ................................. 345/156; 345/163
(58) Field of Search ........................... 345/156, 157, 345/158, 163, 169, 589, 730, 731, 732, 753, 751; 715/730, 731, 732

(56) References Cited

U.S. PATENT DOCUMENTS 4,019,174 A * 4/1977 Vanderpool et al. ........ 702/187
5,212,477 A * 5/1993 Indekeu et al. ............. 340/7.55
5,859,623 A * 1/1999 Meyn et al. ................. 126/369
6,012,103 A * 1/2000 Sartore et al. ................ 710/10
6,128,629 A * 10/2000 Bretschneider et al. ..... 707/203
6,195,712 B1 * 2/2001 Pawlowski et al. ......... 345/156
6,346,933 B1 * 2/2002 Lin ............................. 345/157

OTHER PUBLICATIONS

Universal Serial Bus (USB), Device Class Definition for Human Interface Devices (HID), Firmware Specification—Apr. 7, 1999, Version 1.1, pp. 1–87.

* cited by examiner

*Primary Examiner*—Chanh Nguyen
(74) *Attorney, Agent, or Firm*—Christopher P. Maiorana, PC

(57) ABSTRACT

An apparatus comprising a first device and a bus interface. The first device may be configured to present one or more control signals in response to one or more input instructions. The bus interface may be configured to (i) receive the one or more control signals and (ii) provide power to the device.

31 Claims, 3 Drawing Sheets

APPARATUS AND METHOD FOR CONTROLLING AN ELECTRONIC PRESENTATION

FIELD OF THE INVENTION

The present invention relates to presentation devices generally and, more particularly, to an apparatus and method for controlling an electronic presentation.

BACKGROUND OF THE INVENTION

Giving presentations can be an anxious experience. The anxiety level of giving a presentation can increase when the presentation is given electronically (e.g., using a personal computer running a presentation software package such as PowerPoint or other presentation software).

To a presenter not thoroughly familiar with the operation of the presentation software, it may not be intuitive how to perform the basic task of advancing to the next slide. For example, in PowerPoint advancing to the next slide is accomplished by pressing the left mouse button, or one of several keyboard keys. Inadvertently pressing the right mouse button or other keyboard keys can ruin the presentation by backing up, or worse, exiting the PowerPoint program entirely. Such an error can lead to a flurry of activity, where the presenter often must ask a member of the support staff (or worse the audience) for assistance in resuming the presentation. Such an interruption disrupts the presentation flow and embarrasses the presenter.

Conventional approaches to minimizing errors during a presentation include accessory devices that have been designed and built to attempt to make delivery of an electronic slide show smooth and foolproof. An example of such a device includes wireless remote controls that use an infrared beam similar to a TV remote control. These devices usually attach to the PC through a serial port, and require special "driver" software to translate commands from the port to emulate keystroke or mouse commands that are recognizable by the presentation software. The driver software limits the use of such devices to pre-prepared computers, on which the driver software has been installed. In addition, these devices tend to be complex, to allow many options. Therefore they present a whole new set of "learning curve" challenges to the presenter, and thus may defeat the goal of being simple and foolproof.

SUMMARY OF THE INVENTION

The present invention concerns an apparatus comprising a first device and a bus interface. The first device may be configured to present one or more control signals in response to one or more input instructions. The bus interface may be configured to (i) receive the one or more control signals and (ii) provide power to the device. One aspect of the present invention may include a program configured to either advance or retreat through a plurality of slides in response to the one or more control signals. Another aspect of the invention may include a second device configured to (i) run the program and (ii) communicate through the bus.

The objects, features and advantages of the present invention include implementing an apparatus and/or method that may (i) present simple options to the presenter (e.g., advancing to the next slide of an electronic presentation), (ii) eliminate the presentation of complex options that have the potential for misuse to the presenter (iii) connect to any PC (or Macintosh) without the necessity of pre-installing driver software, (iv) be capable of "hot-plugging" into a computer (e.g., if a spur-of-the-moment decision is made to use the control, the control may be plugged in and activated without re-booting the computer), and/or (v) provide feedback to the presenter in a non-obtrusive manner.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
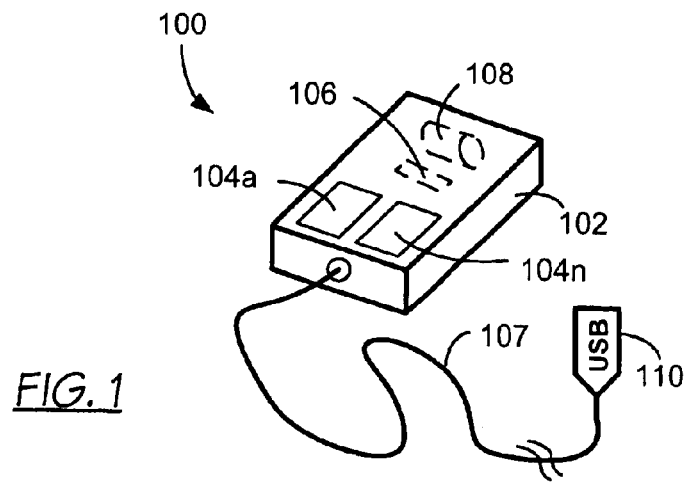
FIG. 1 is a perspective view of a preferred embodiment of the present invention.

Referring to FIG. 1, a perspective view of a device 100 is shown in accordance with a preferred embodiment of the present invention. The device 100 comprises a housing 102, a number of pushbuttons 104a–104n, a control circuit 106, a cable 107, a vibrator assembly 108 and a connector 110. The housing 102 generally contains the pushbuttons 104a–104n and internally contains the control circuit 106. The device 100 may be implemented as USB (Universal Serial Bus) peripheral device. The vibration assembly 108 may be implemented with a small motor and may be configured to vibrate when power is applied. The device 100 may be attached to a host computer, such as a PC or Macintosh, through the connector 110. The connector 110 may be, in one example, a USB connector that may draw power from a bus such as a USB bus. The vibrator assembly 108 may be of the type commonly used in pagers and cell phones. While the device 100 has been described generally in the context of a USB environment, the device 100 may be implemented in the context of other environments that may be appropriate to meet the design criteria of a particular implementation.

The device 100 may provide a simple control that may avoid the presentation of complex options to the presenter. The device 100 may, in one example, provide one or more control signals that may control the advancing or retreating of the next slide of an electronic presentation software package. The device 100 may avoid the requirement for complex instructions that may have the potential for misuse. The device 100 may be connected to a computer (such as a PC or a Macintosh) and may operate without the necessity of pre-installing driver software. The device 100 may have the ability to "hot-plug" into the computer. The ability to hot-plug the device 100 may enable spur-of-the-moment decisions since the device 100 may be plugged in and activated without re-booting the computer.

In one implementation, the device 100 may provide feedback to the presenter in a non-obtrusive manner. For example, if the presenter wishes to know that the next slide is available (there can be a significant delay between slides, particularly if the slides are rich in graphics and require long disk accesses), the device 100 may give the presenter unobtrusive feedback when the next slide is fully loaded and ready for presentation. In another implementation, if an assistant wishes to help pace a presentation by alerting the presenter that time is running low, an indication may be given by having the assistant press a key on the keyboard of the presentation computer. If an assistant presses the CAPS lock key (e.g., key 206a or any other predefined key) the vibrator assembly 108 may be activated, inconspicuously alerting the presenter.

Figure 2:
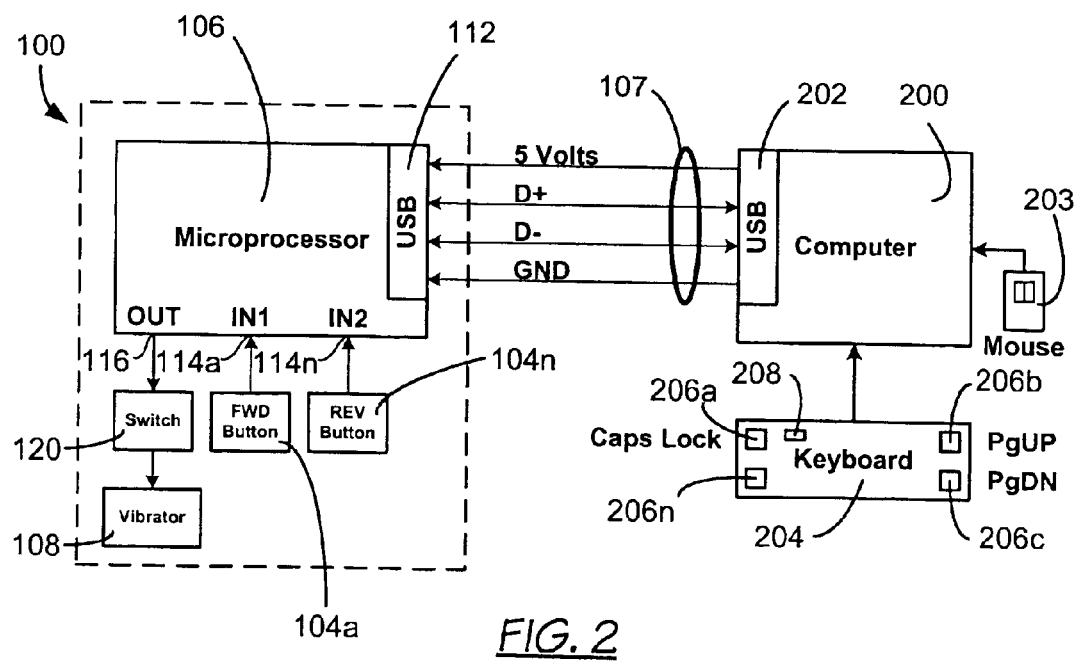
FIG. 2 is a block diagram of a preferred embodiment of the present invention implemented in the context of a personal computer environment.

Referring to FIG. 2, a more detailed diagram of the device 100 is shown implemented with a computer 200. The cable 107 may be implemented, in one example, as a standard USB cable. The cable 107 may connect the device 100 with the computer 200. To operate with the device 100, the computer 200 must generally be equipped with a USB port or other appropriate port.

The computer 200 may have a USB port 202, a mouse 203 and a keyboard 204. The keyboard 204 may have a plurality of keys 206a–206n and an LED 208. In one example, the LED 200 may be implemented as a "CAPS lock indiction light". However, the LED 208 may be implemented as any type LED in order to meet the criteria of a particular implementation. A Page-Up (PgUP) key 206b and a Page-Down (PgDN) key 206c may be implemented to control an electronic presentation program. However, alternate keys may be implemented to control the electric presentation program. The control circuit 106 may contain firmware code that may be written to accommodate any of keys 206a–206n. When the user is running a presentation program on the computer 200, tapping the PgDN key 206 may advance to the next slide and tapping the PgUP key 206c may go back (e.g., retreat) one slide. One hazard of using the keyboard 204 to control the presentation is that if the user inadvertently holds down the key 206b or the key 206c too long, an "auto-repeat" function of the keyboard 204 may be activated. The auto-repeat function may rapidly advance and/or retreat through the remaining slides rather than moving one slide forward or backward. The device 100 may prevent the auto-repeat function.

The control circuit 106 may be implemented as a microprocessor that may include, in one example, a USB port 112. Although the USB port 112 may be implemented externally to the microprocessor 106 in some implementations, it may be advantageous in size and/or cost to use a single-chip solution that may contain both the microprocessor 106 and the USB port 112. An example of a dual implementation of the microprocessor 106 and the USB port 112 may be accomplished with the Cypress Semiconductor CY7C63000A microprocessor, the data sheet of which is hereby incorporated by reference in its entirety. The microprocessor 106 may include an EPROM (not shown) that may store the firmware that may contain the instructions necessary to operate the device 100. The microprocessor 106 may have a number of inputs 114a–114n and an output 116. The input 114a may receive a signal from a forward button 104a. The input 114n may receive an input from a reverse button 104n. The vibrator assembly 108 may be connected to the output 116, through a transistor switch 120. Because the USB cable 107 may provide a source of 5 volt power, the USB cable 107 may power the device 100. The USB cable 107 may eliminate a need for batteries or any other power sources.

In operation, when a presentation program is running on the computer 200, and the user presses the FWD button 104a, the firmware stored in the microprocessor 106 may send, over the USB cable 107, data which may simulate pressing the PgDN key 206c on the keyboard 204. Similarly, when the user presses the REV button 104n, the firmware stored in the microprocessor 106 may send, over USB cable 107, data which may simulate activation of the PgUP key 206b on the keyboard 204. In this way control of the delivery of an electronic slide show may be provided by the device 100. As shown in the program flowchart (to be described in detail in connection with FIG. 4), the FWD button 104a and REV button 104n may provide improved performance over the keyboard buttons 206a–206n, since the buttons 104a and 104n may be pressed indefinitely, without the auto-repeating function of the presentation software. An advantage of using the USB device 100 is that the buttons 104a and 104n may operate simultaneously with the keys 206a–206n. Such simultaneous operation may allow the presentation software to be controlled from either source or both sources simultaneously.

The device 100 may provide unobtrusive feedback to the slide show presenter using the invention by means of the vibrator assembly 108. The vibrator assembly 108 may be activated by the microprocessor 106 via the transistor switch 120 whenever a keyboard light (for example the CAPS lock light) is on. The CAPS lock key 206a and/or 206n may be pressed by an assistant positioned at the computer 200 who wishes to alert the presenter that it is time to move on to the next slide. Alternatively, the CAPS lock light 208 may be activated in an automated manner, such as by a programmed timer in the presentation program software which turns on the CAPS lock light 208 after a predetermined time for each slide. When the CAPS lock key 206a is pressed, either physically or under software control, the computer 200 may turn on the CAPS lock light 208 and simultaneously send a message over the USB cable 107. The message may indicate that the CAPS lock light 208 is on. The microprocessor 106 may be configured to interpret such an event and may turn on the transistor switch 120 to activate the vibrator assembly 108. Similarly, when the CAPS lock key 206a is pressed a second time, the computer 200 may turn off the CAPS lock light 208. The computer 200 may simultaneously send a message over the USB cable 107 indicating that the CAPS lock light 208 is off, which may cause the microprocessor 106 to turn off the vibrator assembly 108.

Figure 3:
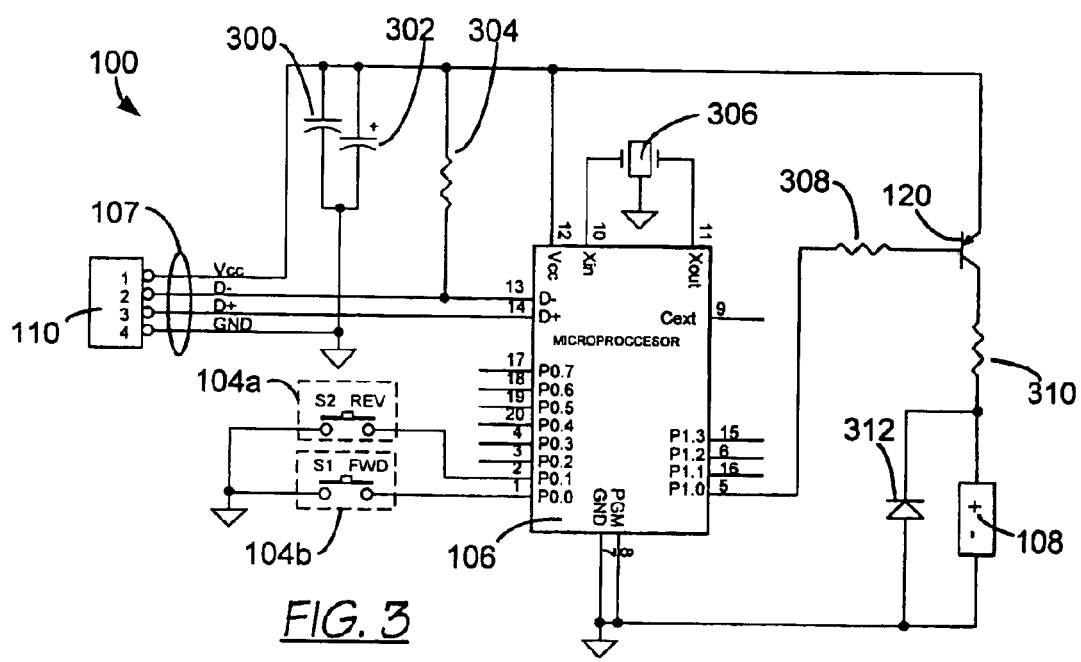
FIG. 3 is a schematic diagram of a preferred embodiment of the present invention.

Referring to FIG. 3, a schematic diagram of the device 100 is shown. A capacitor 300 and a capacitor 302 may provide power supply decoupling. A resistor 304 is generally required by a USB compliant device to indicate the presence of a low speed device. A resonator 306 may provide a time base (e.g., 6 MHz or other appropriate time base) for the microprocessor 106. A resistor 304 may provide base current limiting for the switch 120, which may act as a current amplifier for the vibrator 108. The switch 120 may be implemented, in one example, as a BJT transistor. A resistor 310 may provide current limiting for the vibrator 108. A diode 312 may provide voltage protection for the switch 120, a technique commonly used when switching an inductive load such as the vibrator 108. The USB cable 107 may attach to the USB port 110.

Figure 4:
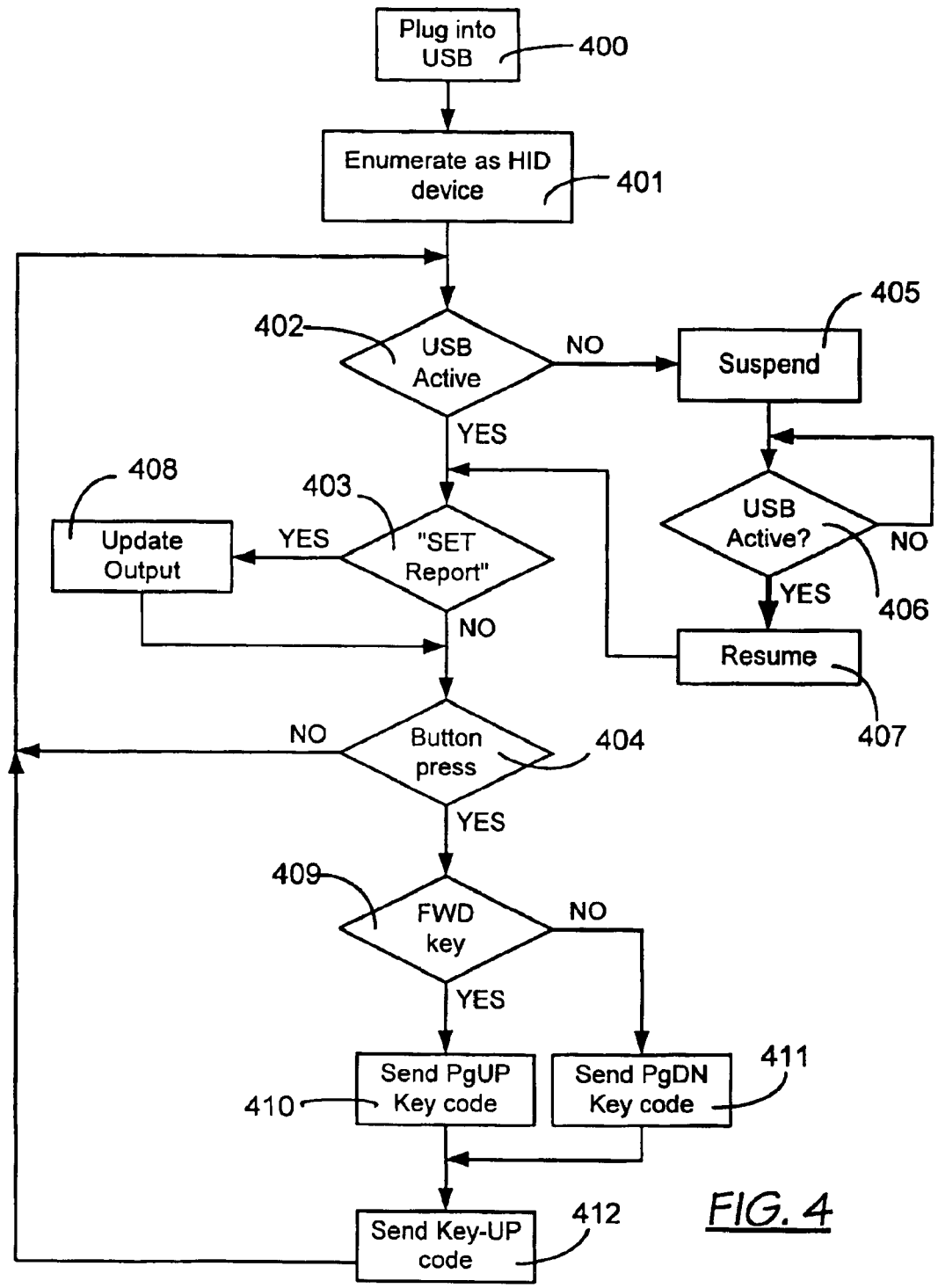
FIG. 4 is a flow chart of the operation of the present invention.

Referring to FIG. 4, a flowchart of the operations performed by the firmware code stored in the microprocessor 106 is shown. The device 100 is plugged into a USB port at a state 400 that may cause a state 401 to enumerate the device 100 as a USB "HID" (Human Interface) device. An example of device enumeration may be found in co-pending applications Ser. No. 08/886,923 and Ser. No. 09/232,578 that are each hereby incorporated by reference in their entirety. The advantage of enumerating as a HID device is that the device driver to operate the device is generally included as a standard part of the operating system of the computer 200. A user plugging in the device 100 for the first time may not need to supply a floppy disk or CDROM with a special driver program.

An endless loop is then entered at the state 402, where a USB bus is checked for activity. According to the USB specification (e.g., USB Specification 1.1, published September 1998, which is hereby incorporated by reference in its entirety), after 3 milliseconds of inactivity, a USB device generally enters a low power suspend state 405. After the suspend state 405, a state 406 generally checks for resumption of USB activity. If USB activity is detected the software enters a state 407 to resume program execution, re-entering the main loop at the state 403. If the bus continues to be inactive, the state 406 continues to loop, waiting for activity.

If the bus is active at the state 402, the state 403 generally checks the control endpoint for a "SET_REPORT" message, which is generally used by the host to transmit the states of the keyboard lights. If the SET_REPORT message is found, the state 408 generally updates the output bit which activates the vibrator assembly 108 (e.g., see FIGS. 1–3), and returns control to the state 404. The state 404 then determines if either of the buttons is pressed, and if so proceeds to the state 409. If no buttons are pressed, the state 404 enters the main program loop at the state 402.

The state 409 determines which button is pressed where the state 410 sends the Page Down keycode, and the state 411 sends the Page Up keycode. Both the state 410 and the state 411 proceed to the state 412, where the key-up code is generally sent. Transmission of the key down code immediately followed by the key-up code may ensure that the computer 200 will not auto-repeat.

The microprocessor 106 is generally programmed to implement the USB "HID" standard such as the Device Class Definition For Human Interface Device (HID), version 1.1, published Apr. 4, 1999, that is hereby incorporated by reference in its entirety. This allows the control to function as a standard keyboard known to the operating system, and therefore the control requires no special driver code to be loaded into the computer 200. Further, the microprocessor 106 may be programmed to implement a standard keyboard HID function, with the pushbuttons 104a–104n acting as the keyboard key normally used to advance an electronic presentation to the next slide. The microprocessor 106 may be programmed to recognize the command sent to all keyboards which turns on and off the "Caps Lock" or similar keyboard LED. When such an indication is received, the microprocessor 106 generally applies power to the vibrator assembly 108 and thus unobtrusively alerts the presenter whenever an assistant at the presenting PC keyboard presses the Caps Lock (or similar) key. The microprocessor 106 may also be programmed to activate the vibrator assembly 108 on an automated basis (e.g., when the next slide is available for display).

While the invention has been particularly shown and described with reference to the preferred embodiments thereof, it will be understood by those skilled in the art that various changes in form and details may be made without departing from the spirit and scope of the invention. For example, the present invention may incorporate a laser pointer that may also be powered along with the device 100.

What is claimed is:

1. An apparatus comprising:
    a housing having an upper surface;
    a first button disposed in said upper surface and configured to generate a first instruction;
    a first device (i) disposed within said housing and (ii) configured to generate one or more first control signals in response to said first instruction, wherein said first control signals consist of signals dedicated to advancing through a plurality of slides presented by an electronic presentation program;
    a resonator (i) disposed within said housing and (ii) coupled to said first device; and
    a bus interface disposed within said housing and configured to (i) present said one or more first control signals and (ii) provide power to said first device, wherein said first device is configured to operate according to a standard device driver provided in an operating system and said apparatus is configured to connect, in addition to a mouse and a keyboard, to a second device configured to run said electronic presentation program.

2. The apparatus according to claim 1, further comprising:
    a second button disposed in said upper surface and configured to generate a second instruction, wherein (i) said first device is further configured to generate one or more second control signals in response to said second instruction, said one or more second control signals consisting of signals dedicated to retreating through said plurality of slides and (ii) said bus interface is further configured to present said one or more second control signals.

3. The apparatus according to claim 2, wherein:
    said second device is configured to communicate through a cable coupled to said bus interface.

4. The apparatus according to claim 2, wherein said first instruction and said second instruction are generated by a presenter.

5. The apparatus according to claim 2, wherein said first instruction and said second instruction are generated in response to said first button and said second button, respectively, being pressed.

6. The apparatus according to claim 2, wherein said first device is configured to advance and retreat through said plurality of slides one slide at a time.

7. The apparatus according to claim 1, wherein said bus interface comprises a Universal Serial Bus (USB) bus interface.

8. The apparatus according to claim 1, wherein said first device is configured to communicate via a wireless link with said second device.

9. The apparatus according to claim 1, wherein said first device is configured to control said electronic presentation program simultaneously with said keyboard and said mouse.

10. The apparatus according to claim 1, wherein said second device comprises a computer.

11. The apparatus according to claim 10, wherein (i) said bus interface is configured to be hot-plugged to said computer at any time, even while said computer is running and (ii) said apparatus is immediately available for use without re-booting or re-powering said computer.

12. The apparatus according to claim 1, wherein said first device is configured to operate without user-installed driver software.

13. The apparatus according to claim 1, further comprising:
    an alert indicator disposed in said housing.

14. The apparatus according to claim 13, wherein said alert indicator comprises a visible indicator disposed in a surface of said housing.

15. The apparatus according to claim 13, wherein said alert indicator comprises a vibrator disposed within said housing.

16. The apparatus according to claim 1, further comprising a laser pointer.

17. The apparatus according to claim 1, wherein said apparatus is configured as a handheld device.

18. The apparatus according to claim 1, wherein said first device is configured to enumerate as said standard device.

19. The apparatus according to claim 18, wherein said first device is configured to enumerate as a human interface device (HID).

20. The apparatus according to claim 1, wherein said first device is further configured to implement a standard keyboard human interface device (HID) function.

21. The apparatus according to claim 1, wherein said first device does not generate signals representing movement of said device or any of an x displacement, a y displacement, an x position and a y position.

22. The apparatus according to claim 1, wherein said first device is further configured such that said first device cannot inadvertently exit said electronic presentation.

23. A method for controlling an electronic presentation comprising the steps of:

(A) providing a first device comprising (i) a housing, (ii) a first button disposed in a surface of said housing, (iii) a control circuit disposed within said housing and configured to generate one or more first control signals in response to said first button being pressed and (iv) a resonator disposed in said housing and coupled to said control circuit, wherein said one or more first control signals consist of signals dedicated to advance said electronic presentation through a plurality of slides presented by an electronic presentation program and said device is configured to connect, in addition to a mouse and a keyboard, to a second device configured to run said electronic presentation program;

(B) providing power over a bus to said first device; and (C) operating said first device according to a standard device driver provided in an operating system.

24. The method according to claim 23, further comprising the step of:

providing a second button (i) disposed in said surface of said housing and (ii) configured to generate one or more second control signals in response to said second button being pressed, wherein said one or more second control signals consist of signals dedicated to retreat said electronic presentation through said plurality of slides.

25. The method according to claim 24, wherein said one or more first control signals advance said electronic presentation by a single slide only and said one or more second control signals retreat said electronic presentation by a single slide only.

26. The method according to claim 23, wherein said method is implemented using a Universal Serial Bus (USB) bus interface.

27. The method according to claim 23, wherein said first device is further configured to not interrupt said electronic presentation.

28. The method according to claim 23, wherein said first device is further configured to not generate signals representing any of an x displacement, a y displacement, an x position and a y position.

29. The method according to claim 23, further comprising the step of:

eliminating the presentation to a presenter of complex options that have a potential to disrupt a flow of said electronic presentation.

30. An apparatus comprising:

a device consisting of (a) a housing configured to be held in a hand of a presenter, (b) a first button and a second button disposed in a surface of said housing, (c) a control circuit (i) disposed within said housing and (ii) configured to generate one or more first control signals when said first button is pressed and one or more second control signals when said second button is pressed and (d) a resonator (i) disposed within said housing and (ii) coupled to said control circuit, wherein (i) said one or more first control signals and said one or more second control signals are dedicated to controlling advancement through a plurality of slides presented by an electronic presentation program and (ii) said control circuit is configured to communicate through a bus with a standard device driver provided in an operating system; and a computer configured to (i) run said electronic presentation program and (ii) communicate through said bus, wherein said computer simultaneously controls said electronic presentation program in response to said device, a keyboard and a mouse.

31. The apparatus according to claim 30, wherein said device is configured to connect to said computer in addition to said keyboard and said mouse.

* * * * *